(12) United States Patent
Bankston et al.

(10) Patent No.: US 7,619,761 B2
(45) Date of Patent: Nov. 17, 2009

(54) EXTENSIBLE AND DISTRIBUTED JOB EXECUTION SERVICE IN A SERVER FARM

(75) Inventors: John Keith Bankston, Bothell, WA (US); Michael H Ammerlaan, Redmond, WA (US); Suresh Tharamal, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 875 days.

(21) Appl. No.: 11/172,048

(22) Filed: Jun. 30, 2005

(65) Prior Publication Data

US 2007/0005732 A1 Jan. 4, 2007

(51) Int. Cl.
*G06F 15/00* (2006.01)
*G06F 15/16* (2006.01)
(52) U.S. Cl. ..................................... 358/1.14; 709/203

(58) Field of Classification Search ................. 358/1.14, 358/1.15, 1.16, 1.18, 1.1; 709/201, 203, 709/202, 219, 225, 226, 224; 370/230.1, 370/352, 401, 912; 379/219, 265.09, 88.17; 707/6, 10, 202
See application file for complete search history.

(56) References Cited

U.S. PATENT DOCUMENTS 5,325,527 A * 6/1994 Cwikowski et al. ......... 709/222
2008/0034369 A1 * 2/2008 Polizzi et al. ............... 718/102

* cited by examiner

*Primary Examiner*—Saeid Ebrahimi Dehkordy
(74) *Attorney, Agent, or Firm*—Merchant & Gould P.C.

(57) ABSTRACT

A system and method is provided that centrally stores in a server farm custom jobs defined by developers or administrators of the server farm. The system and method enables the server farm to automatically distribute the jobs to servers in the server farm and to execute the jobs according to parameters defined for the jobs.

20 Claims, 8 Drawing Sheets

EXTENSIBLE AND DISTRIBUTED JOB EXECUTION SERVICE IN A SERVER FARM

BACKGROUND

Nowadays, the Internet is widely used to transfer applications to users through browsers. The Internet also is used for e-commerce in which individual customers and businesses use the Web to purchase various goods and services. In fact, some companies offer goods and services solely on the Web while others use the Web to extend their reach.

With respect to these commercial activities and others, businesses and content providers employ servers to process requests from different users. Various architectures are employed in handling these requests. Often, distributed architectures in which a set of servers in a cluster ("server farm") are used to handle requests. In such a server farm architecture, the set of servers appears to a user as a single server. A load-balancing mechanism may be used to determine which server within the server farm will be used to handle various requests directed to the server farm.

Configuring and maintaining the various servers within a server farm has historically been a challenge. This challenge is exacerbated as the number of servers employed in a given server farm increases in number and as more features, implemented for the applications running on the server farm, are added to the server farm as customized operations ("jobs"). For example, administrators of a server farm often want to run timed jobs on servers in the server farm. Such a job may be a one-time job that only runs once by any of the servers in the server farm. Such a job can also be a recurring job that executed at a definable interval, during a certain time period in the hour, day, week, month, or year. Usually, such jobs may be defined by developers enhancing applications running on the server farm, and submitted to the server farm by authorized personnel ("administrator") of the server farm. Therefore, it is desirable to provide a system and method that can easily integrate jobs submitted by administrators into the server farm. It is also desirable that the jobs can be automatically deployed to proper servers in the server farm and executed in a consistent manner.

SUMMARY

The invention addresses the above-identified needs by providing a system and a method for centrally storing in a server farm job definitions submitted by administrators of the server farm, automatically distributing the job definitions to servers in the server farm, and consistently executing jobs defined by the job definitions on suitable servers in the server farm.

One aspect of the invention provides a configuration database that stores all job definitions submitted to the server farm by administrators of the server farm. The submitted job definitions may extend a configuration object model that enables the job definitions to be integrated into the configuration database without the administrators understanding or modifying the underlying schema of the configuration database. Preferably, an interface such as a command-line interface or a graphic user interface can be used to view and/or modify any job definition existing in the configuration database. The interface may exist on a system outside the server farm.

According to another aspect of the invention, each job definition also extends a job definition object model. The job definition object model includes multiple properties used to define a job. Such properties may be used to identify, for example, the job, handler to the assembly file containing implementation code for the job, handler to the class that defines the job. Such properties may also be used to identify a server on which the job runs, the service that the job is associated with, and whether the job can be re-executed if the execution of the job fails for various reasons. Such properties may be used to identify whether the job runs on exactly one of the servers or runs on all servers. Such properties may also be used to determine whether no locking is needed, job level locking is needed, or database level locking is needed. Such properties may be used to identify running schedule for the job, when the job is lastly run, whether the job is exclusive, or next job in line if the job is in a job sequence. The job definition object model may also include multiple functions such as a function to update the status of the job, to delete the job definition, or to start executing the job.

In addition, the configuration database may also include multiple running job objects for jobs that are currently running on servers in the server farm. Each running timer object may extend a running job object model. The running job object model may include multiple properties such as properties for identifying when a running job starts executing, the job definition that the running job is associated with, the current status of the running job, the percentage of work the running job has completed. The properties may also be used to identify the server(s) that the job is currently running on, the service that the running job is associated with, etc. The running job object model may also include multiple functions such as a function to stop execution of the job and a function to update status or progress of the job.

The configuration database may further include multiple service objects. Each service object includes a property identifying a collection of job definitions that are available on the server in which a service exists. A service object may also include a property indicating a collection of running job objects for jobs that are currently running on the server in which a service exists.

In accordance with yet another aspect of the invention, each server in the server farm operates a timer service. The timer service queries the configuration database periodically to retrieve any change in the configuration database, including any new or modified job definitions. The timer service downloads such change to the server. The timer service then identifies any job definitions that are suitable to be executed on the server. Preferably, the timer service may first query and search for new or modified job definitions that are suitable to be run on the server and then downloading them to the server. For each of such job definitions, the timer service executes the job defined by the job definition at the time specified by the job definition. A job may run only once or with recurrence.

In accordance with a further aspect of the invention, if a job contains functions that modify the local server system, the timer service transfers the execution of the job to an admin service that has local admin privilege. The admin service only executes the functions in the job that require the local admin privilege.

Another aspect of the invention uses a lock to distribute execution of a job among different servers in the server farm. For example, a first timer service executing a job first locks the corresponding job definition in the configuration database. A second timer service running on another server can execute the job only if the lock has been released by the first timer service or the first timer service's holding of the lock seems to be unreasonably long. For jobs that require database locking, multiple such jobs share a database lock, and a server that has a database lock will execute all such jobs to run against that database. The locking scheme also supports failover, such that each server refreshing its locks at a predetermined interval, and when a server goes down, once its lock expires, another server will acquire that lock and execute all jobs that utilize that lock. In accordance with yet another aspect of the invention, multiple jobs can be arranged into a job sequence. Only after a job in the job sequence has been completed, will the next job in the job sequence start to execute.

In summary, the invention provides a system and method that allows administrators to submit job definitions for a server farm to a configuration database in the server farm. The invention also enables jobs defined by the job definitions to be automatically distributed and executed among different servers in the server farm according to the job definitions. As a result, services provided by a server farm can be expanded by job definitions containing jobs that the server farm is capable of automatically distributing and executing.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The novel features believed characteristic of the invention are set forth in the appended claims. The invention itself, however, as well as the preferred mode of use, further objectives and advantages thereof, will best be understood by reference to the following detailed description of an illustrative embodiment when read in conjunction with the accompanying drawings, wherein:

DETAILED DESCRIPTION OF THE EXEMPLARY EMBODIMENTS

Figure 1:
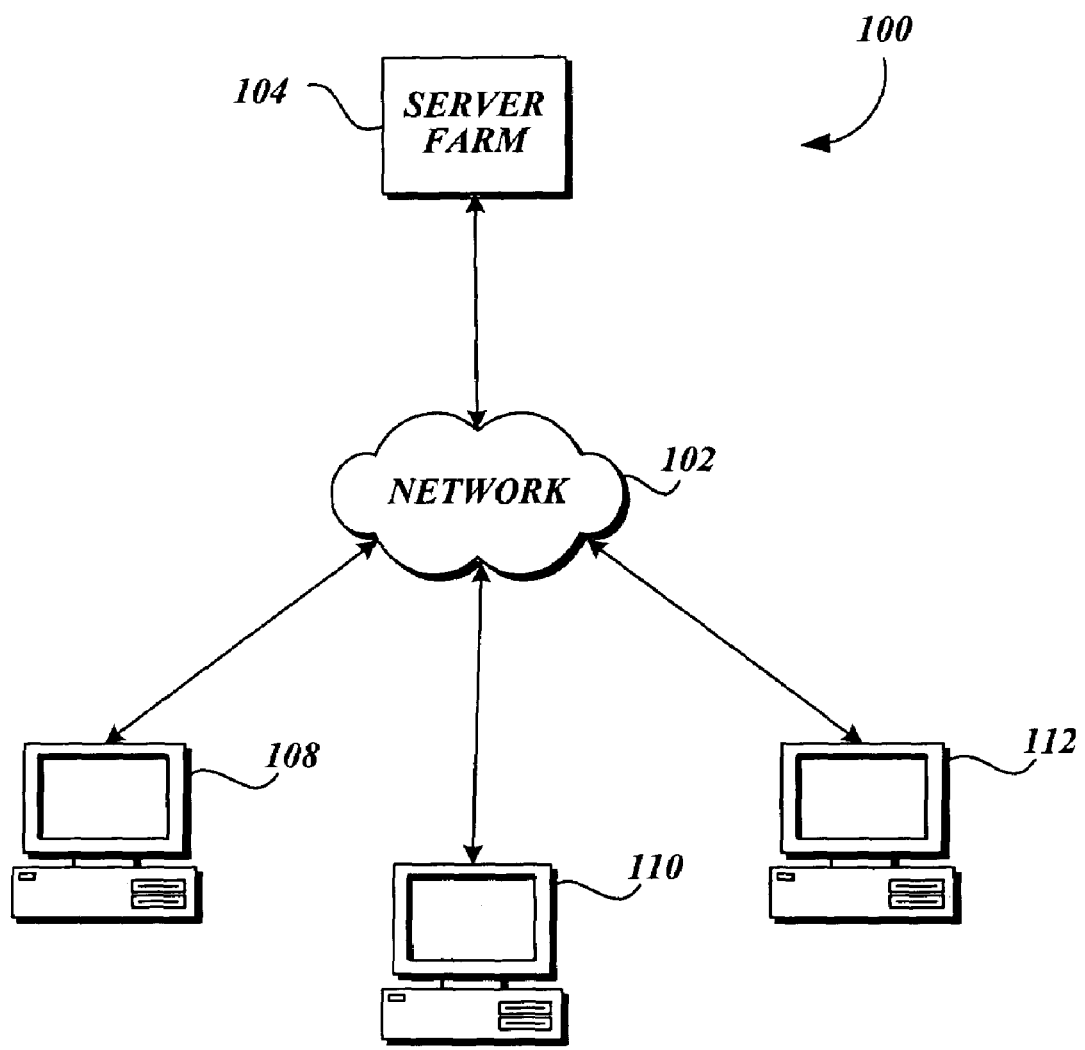
FIG. 1 is a block diagram illustrating an exemplary network of data processing systems in which aspects of the invention may be implemented.

FIG. 1 illustrates a pictorial representation of a network 100 of data processing systems in which an exemplary embodiment of the invention may be implemented. The network 100 of data processing systems includes a network 102, which is a medium used to provide communication links between various devices and computers connected together within the network 100 of data processing systems. The network 102 may include connections such as a wired or wireless communication link, fiber optic cables, and the like.

As shown in FIG. 1, the network 100 of data processing systems includes at least one server farm 104 and one or more clients 108-112, all of which are connected to the network 102. The server farm 104 is generally comprised of a set of servers that are presented as a single server or a "virtual" server for processing requests. The clients 108, 110, and 112 are clients to the server farm 104. These clients 108, 110, and 112 may be, for example, personal computers or network computers. Generally, the server farm 104 provides data, such as boot files, operating system images, applications, Web content, to the clients 108-112. The network 100 of data processing systems may include additional servers, clients, and other devices not shown.

In the depicted example, the network 100 of data processing systems is the Internet, where the network 102 represents a worldwide collection of networks and gateways that use a TCP/IP suite of protocols to communicate with one another. At the heart of the Internet is a backbone of high-speed data communication lines between major nodes or host computers. These nodes or host computers include thousands of commercial, government, educational, and other computer systems that route data and messages. The network 100 of data processing systems may also be implemented as a number of different types of networks, such as, for example, an intranet, a local area net (LAN), or a wide area network (WAN). FIG. 1 is intended as an example, and not as an architectural limitation of the invention.

Figure 2:
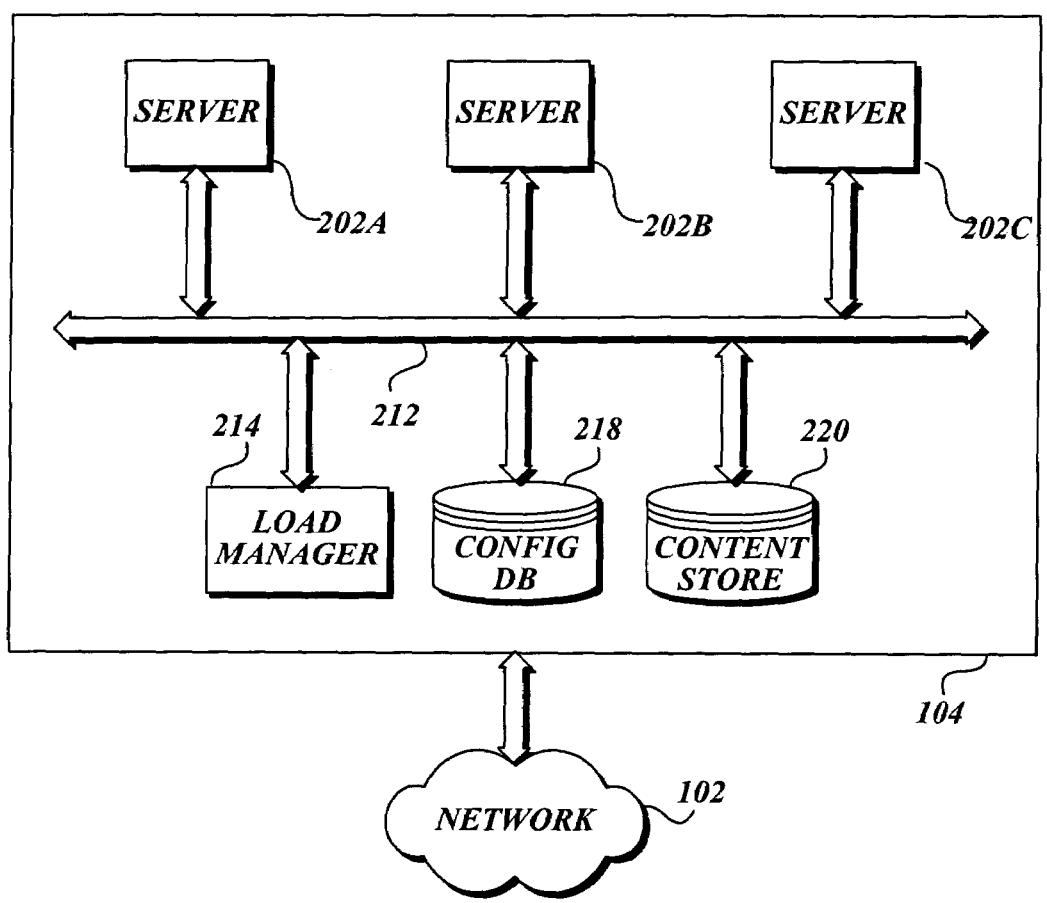
FIG. 2 is a block diagram illustrating an exemplary server farm suitable for use in FIG. 1.

FIG. 2 is a block diagram of a server farm 104 in accordance with an exemplary embodiment of the invention. As shown in FIG. 2, the server farm 104 includes a plurality of servers such as servers 202a, 202b, 202c, each of which communicates with each other through a communication system 212. The communication system 212 is used to handle routing requests and responses directed towards the server farm 104. The communication system 212 may take various forms, including, for example, a bus, a network, a shared memory, or the like. In embodiments of the invention, the servers 202a-202c can have different server roles, i.e., performing different functions in the server farm 104. For example, if the server farm 104 is a Web farm, the server 202a can be a front-end Web server, the server 202b can be a search engine, while the server 202c can be an application server. A server can have more than one server role at a time. For example, the server 202a can be both a front-end Web server and a search engine.

The server farm 104 may include a load manager 214 that is connected to the communication system 212 and that serves to receive requests directed to the server farm 104 from the network 102. The requests may include requests received from clients 108-112 (FIG. 1) and may include, for example, requests for Web pages, files, or other content. The load manager 214 operates to distribute the requests to servers 202a-202c for processing. Essentially, the load manager 214 operates to ensure that none of the servers 202a-202c of the server farm 104 is unnecessarily burdened by requests made of the server farm 104.

In embodiments of the invention, the server farm 104 includes a configuration database 218 that stores all the configuration data for the server farm 104. In embodiments of the invention, the configuration database 218 is the master copy of all configuration data in the server farm 104, thus enables the same information to be available across a set of servers in the server farm 104. The configuration database 218 is operatively connected to the communication system 212 to allow configuration data to be sent to each of the servers 202a-202c in the server farm 104. The configuration database 218 may be used to manage configuration settings of each of the servers 202a-202c. The configuration database 218, therefore, acts as a central repository for any configuration settings that must be changed and/or added to the various servers 202a-202c of the server farm 104. Providing the configuration database 218 eliminates the necessity of having to manually update and/or add configuration settings of the servers 202a-202c. Besides storing information about a server topology, the configuration database 218 may also store application-specific settings such as security policies, antivirus definitions, language settings, etc.

Figure 5:
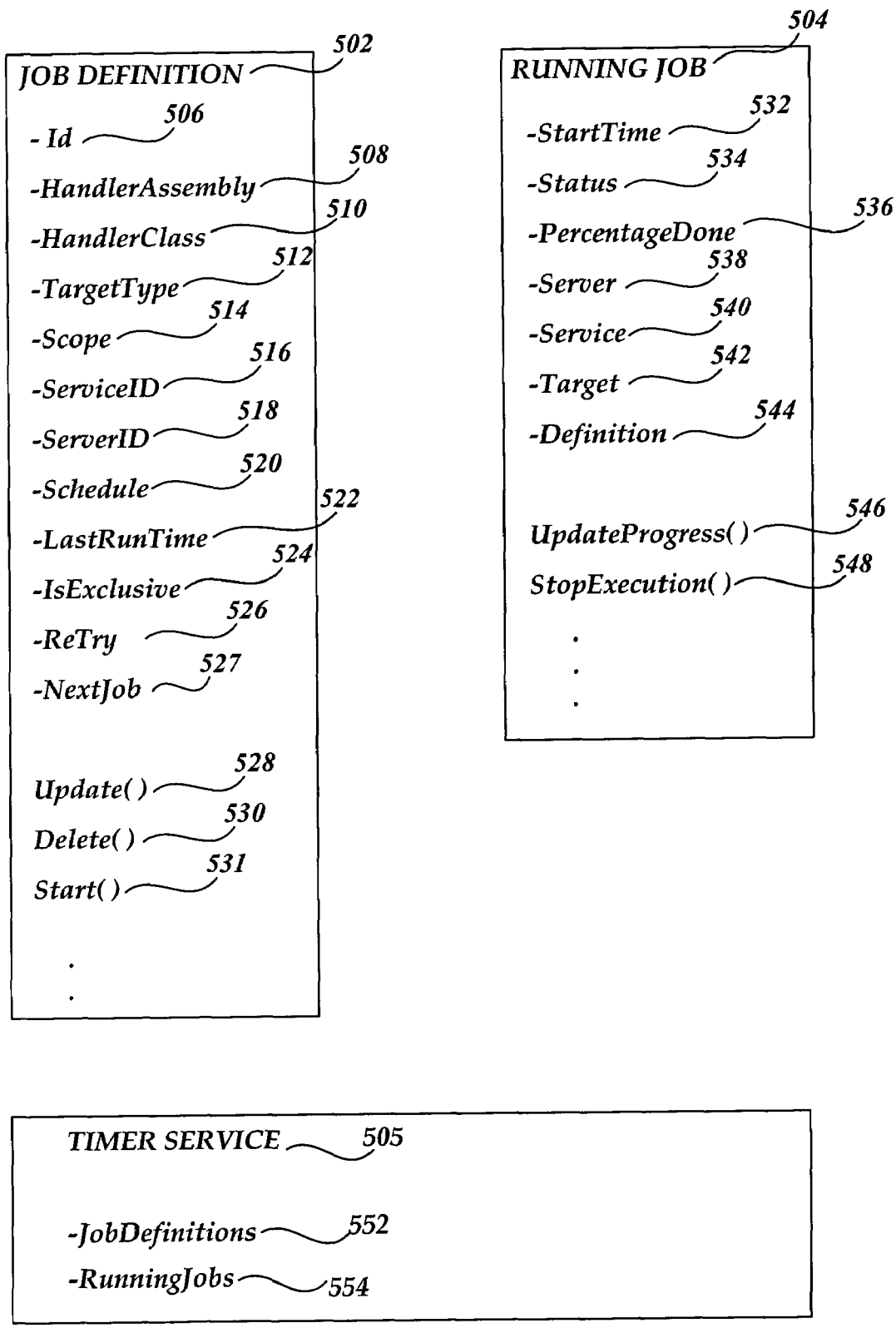
FIG. 5 is a block diagram illustrating exemplary object models used by aspects of the invention.

In embodiments of the invention, the configuration database also stores one or more job definitions submitted by administrators of the server farm 104; each job definition contains a job that is to be run on one or more servers in the server farm 104. A job includes code that can instruct a server to provide specific content or services. In embodiments of the invention, a job definition is a logical object that includes multiple properties defining a job and multiple functions operating the job. FIG. 5 illustrates an exemplary job definition object model and will be described in detail later.

The server farm 104 may also include at least one content database 220. Similar to the other operational elements of the server farm 104, the content database 220 is operationally connected to the communication system 212 in order to allow information stored within the content database 220 to be distributed to the various components of the server farm 104. In exemplary embodiments of the invention, the content database 220 contains data for the servers in the server farm 104. Such data include documents, data items, discussions, tasks, etc. The content database 220 operates in conjunction with the configuration database 218 to provide content specifically related to a given configuration change of one or more of the servers 202a-202c. In exemplary embodiments of the invention, the content database 220 does not interface with the configuration database 218. The configuration database 218 contains a map of which content database stores data for a server. As a result, it is not necessary to query each content database 220 in the server farm 104 to see if the content database contains the content for a particular server in the server farm 104. The cluster of servers mapped to a content database is called a virtual server for the content database.

In exemplary embodiments of the invention, the server farm 104 is arbitrarily extensible. This includes that the server farm 104 can be arbitrarily extended with multiple servers other than the servers 202a-202c. In addition, the server farm 104 may include multiple content databases 220 to store data for the multiple servers in the server farm 104.

Figure 3:
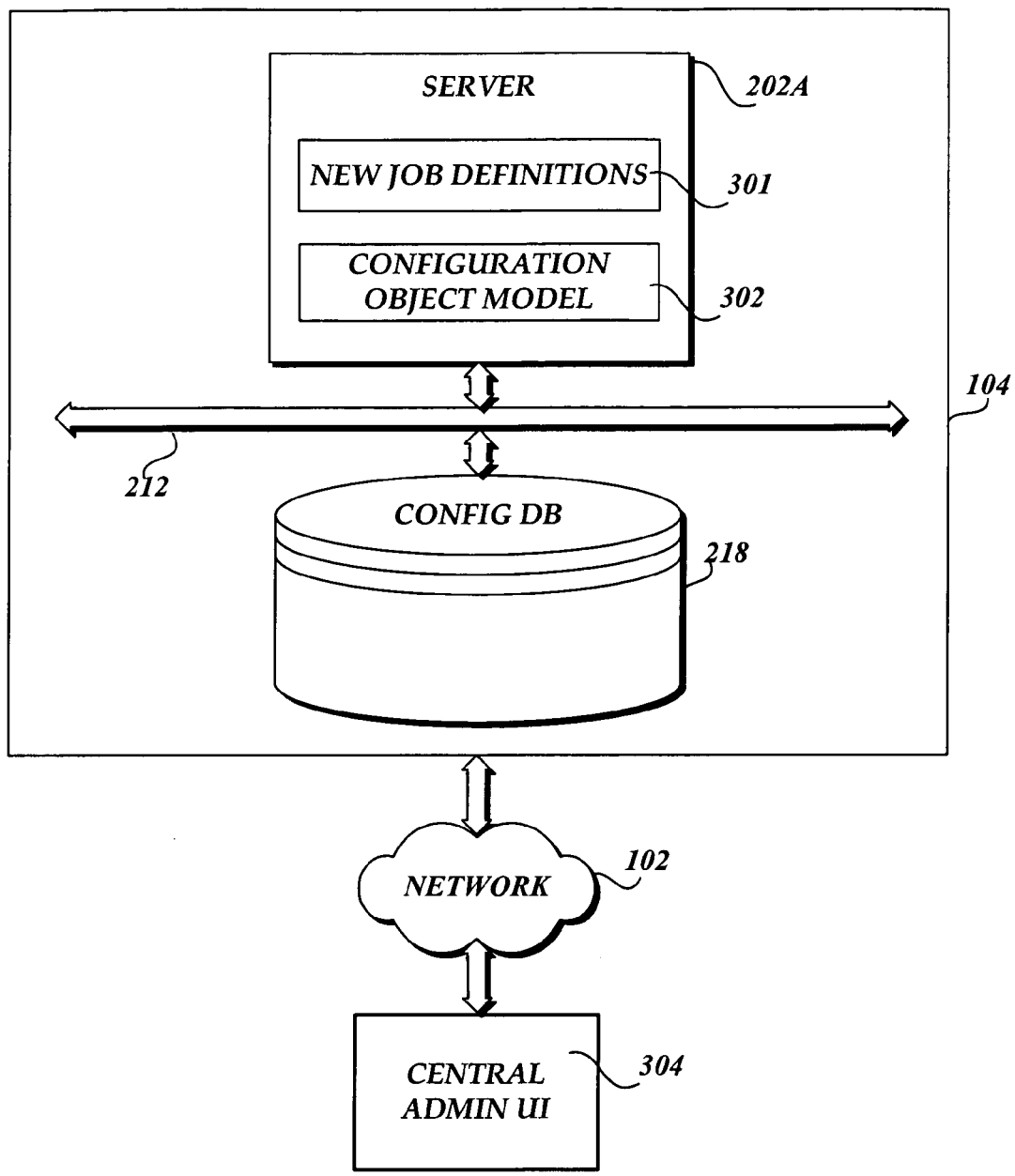
FIG. 3 is a block diagram illustrating an exemplary server farm, wherein new job definitions are submitted to a configuration database in the server farm.

In particular, exemplary embodiments of the invention allow a developer to extend services provided by the server farm 104 by defining jobs accordingly to the developer's preferences and adding the resultant job definitions such as new job definitions 301 to the configuration database 218. Preferably, as shown in FIG. 3, the new job definitions 301 extend a configuration object model 302. Exemplary embodiments of the invention enable arbitrary extension of the configuration database 218 by providing a configuration object model 302. The configuration object model 302 allows a developer providing a job definition to integrate the job definition into the configuration database 218 without understanding or modifying schema of the configuration database 218. In an exemplary embodiment of the invention, the configuration object model 302 includes a Net object-based class. A developer can extend the base class by subclassing and/or instantiating the base class with specific configuration data. Such data is then integrated into the configuration database 218. As a result, the developer only needs to go through the configuration object model 302 to interact with the configuration database 218 and add varying types of data into the configuration database 218. The developer does not need to understand or modify the schema of the configuration database 218. In an exemplary embodiment of the invention, objects containing configuration information for an application is either derived from or contained by the base class, named, for example, as PersistedObject. When updated, this class will serialize into XML all fields marked with the "persisted" attribute, and write the XML blob into the configuration database 218. The base class contains code to serialize all of its members that are base types, other PersistedObjects, or collections of one of the two. Such design allows new objects containing configuration data for the server farm 104 to be added to the configuration database 218 as needed. In exemplary embodiments of the invention, the new job definitions 301 can be submitted to the configuration database 218 from any server in the server farm 104.

Embodiments of the invention also provide an interface such as the central admin UI 304 that allows an administrator of the server farm 104 to view and/or modify any existing job definitions stored in the configuration database 218. The central admin UI 304 can be a command-line interface or a graphic user interface. The central admin UI 304 can be run from any server in the server farm 104. The central admin UI 304 can also run on a system outside the server farm 104 and communicate with the server farm 104 through the network 102.

Embodiments of the invention enable automatic distribution and execution of a job defined by a given job definition on one or more proper servers in the server farm 104. Embodiments of the invention provide a pull-based mechanism for querying and retrieving job definitions from the configuration database 218 to a server in the server farm 104. Using such a pull-based mechanism avoids the need to open an additional TCP/IP port on a server such as the server 202a in order to communicate with the configuration database 218. By not requiring an additional open port, less risk is resulted on the server by not exposing a potential entryway for hackers, viruses, or other forms of attack.

Figure 4:
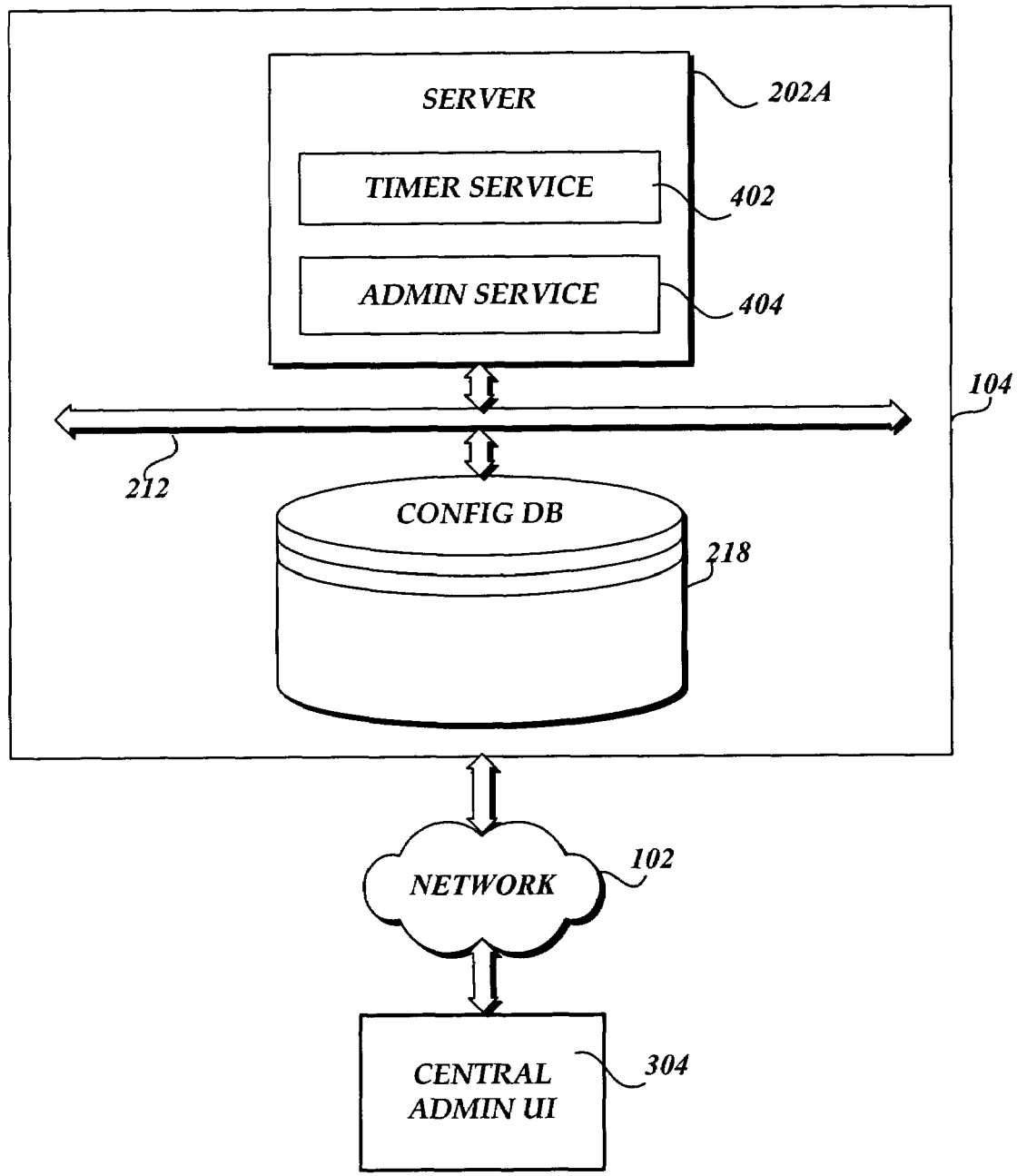
FIG. 4 is a block diagram illustrating an exemplary server farm, wherein an exemplary server in the server farm contains one or more services for implementing aspects of the invention.

In exemplary embodiments of the invention, such a pull-based mechanism is realized by a timer service running on each server in the server farm 104. Preferably, the server may not contain a database. In embodiments of the invention, the timer service queries the configuration database 218 to identify new job definitions that are submitted to the configuration database 218 since the last query. FIG. 4 illustrates an exemplary timer service 402 on the server 202a. Operationally, the timer service 402 may periodically query the configuration database 218 to identify and to download any new job definitions that appeared since the last query. The timer service 402 then executes any job that is suitable to be executed on the server 202a according to the job's corresponding job definition.

In exemplary embodiments of the invention, the timer service 402 has rights to modify the content database 220 and the configuration database 218, but does not have permissions on the server 202a to do operations such as modifying files. For high privileged operations like resetting a password for an application on the server 202a, the job containing such operations needs to have high privileges such as a local admin privilege on the server 202a. To allow such operations to be executed, in an exemplary embodiment of the invention, the timer service 402 use a remote procedure call to roll the execution of the job over to a separate service on the server 202a, the admin service 404. The admin service 404 runs with high privileges such as a local admin privilege. In exemplary embodiments of the invention, the admin service 404 is only engaged to execute functions in a job that modify entities or services on the server 202a. The segmentation between the timer service 402 and the admin service 404 ensures that the timer service 402 does not receive more security privileges than necessary.

In embodiments of the invention, job definitions in the configuration database 218 also extend a job definition object model. The configuration database 218 also includes running job objects for jobs that are currently running on the servers of the server farm 104; each running job object extends a running job object model. The configuration database 218 further includes a service object for each service in the server farm 104, including the timer service such as the timer service 402. FIG. 5 illustrates exemplary properties and functions for an exemplary job definition object model 502, an exemplary running job object model 504, and an exemplary service object model 505. Other embodiments of the invention may provide fewer or more properties and/or functions for these exemplary object models.

In embodiments of the invention, the job definition object model 502 includes properties that define a job, which can be a recurring job, a scheduled one-time job, or an immediate job. If a one-time job has been instanced, a corresponding running job object exists in the configuration database 218. FIG. 5 illustrates exemplary properties and functions included in the job definition object model 502. For example, the job definition object model 502 may include an ID property 506 that uniquely identifies a job, a HandlerAssembly property 508 for identifying name of an assembly file containing the implementation code for the job, and a HandlerClass property 506 for identifying name of the class implementing a handler for the job.

The job definition object model 502 may also include a TargetType property 512 for identifying target of the job. In embodiments of the invention, the TargetType property 512 of a job may have an enumeration value of NULL, which indicates that the job should not be targeted at anything in particular. If the TargetType property 512 has an enumeration value of "single," it indicates that the job should be run on exactly one of the servers in the server farm 104. If the TargetType property 512 has an enumeration value of "ContentDatabase," it indicates that the job should be run on a specific server that is mapped to a specific content database in the server farm 104. As noted above, when describing the content database 220, one server in the server farm 104 may be associated, i.e., targeted at one or more content databases in the server farm 104.

The job definition object model 502 also includes an IsDisabled property 514 such that if the property is set, the job will not be executed but will remain in the configuration database. The Service property 516 may be used to identify service type for the job. If the value of the Service property 516 is the timer service itself, the job will run on all servers in the server farm 104. If the value is set to a particular service, the job will run only on servers that have this service. Similarly, the Server property 518 identifies a specific server. If the value of the Server property 518 is NULL, the job will run on all servers in the server farm 104. Otherwise, the job will only run on the server that has the value specified by the Server property 518.

The job definition object model 502 includes a Schedule property 520, whose value identifies the running schedule of the job. The LastRuntime property 522 specifies the last time that the job was run. If the job has never been run before, the value of the LastRuntime property 522 is set to be an arbitrary unrealistic value, such as a date in the past. The IsExclusive property 524 indicates whether the job should run by itself on a given server in the server farm 104. The Retry property 526 is used to indicate whether the job can be re-executed if an execution of the job fails for various reasons.

Some embodiments of the invention enable an administrator to schedule multiple jobs into a job sequence. The job sequence contains a plurality of jobs that need to be executed in sequence. A job in the job sequence needs to complete on all the targets it is scheduled to run, before the next job in the job sequence can run. In a job sequence, the first job determines when the job sequence will start. After the first job completes, each job in the sequence is queued up as soon as the previous job completes, until the final job is serviced. Consequently, the job definition object model 502 may include a NextJob property 527, whose value returns the job definition of the next job in the job sequence that the job is in. This property is set to be NULL if the job is not in a job sequence.

The job definition object model 502 may also include exemplary functions such as an Update( ) function 528 that updates the state of a job definition. The job definition object model 502 may further include an Execute( ) function 529. This function contains the specific operations offered by the job. The job definition object model 502 may also include a Delete( ) function 530 that removes the job definition from a list of available job definitions. The job definition object model 502 may further include a Start( ) function 531 that creates a new job instance using a job definition. This function may be used by an administrator of the server farm 104 to start a job immediately. The job definition object model 502 may also include an UpdateProgress( ) function 546 that updates the progress of an instance of the job. A running job object represents a running instance of a job and has read-only properties. The running job object model 504 contains exemplary properties and functions that are used to get information about a job that is in execution. For example, the running job object model 504 includes a StartTime property 532 for identifying the time at which the running job is started. The Status property 534 is used to indicate the current status of a running job. In an exemplary embodiment of the invention, the value of the Status property 534 may indicate that the running job has been initialized, that the running job has completed successfully, that the running job has failed because of an internal error, that the running job has stopped while the timer service is attempting to re-execute the job, or that the running job has been aborted upon receiving a request from an administrator, or that it is being re-executed. The PercentageDone property 536 may be used for indicating what percentage of the running job has been completed. The ServerName property 538 may be used to identify the server that the job is running on. The ServiceId property 540 is used to identify the service object that the job is contained within. The JobDefinition property 544 is used to identify the job definition that defines the running job.

The job definition object model 504 may contain one or more functions, such as a StopExecution( ) function 548 that stops the running of the job.

As shown in FIG. 5, the service object model 505 includes a JobDefinitions property 552 for identifying a collection object that contains all available job definitions associated with a service object. The service object model 505 may also include a RunningJobs property 554 that contains all running job objects associated with the service object.

Figure 6:
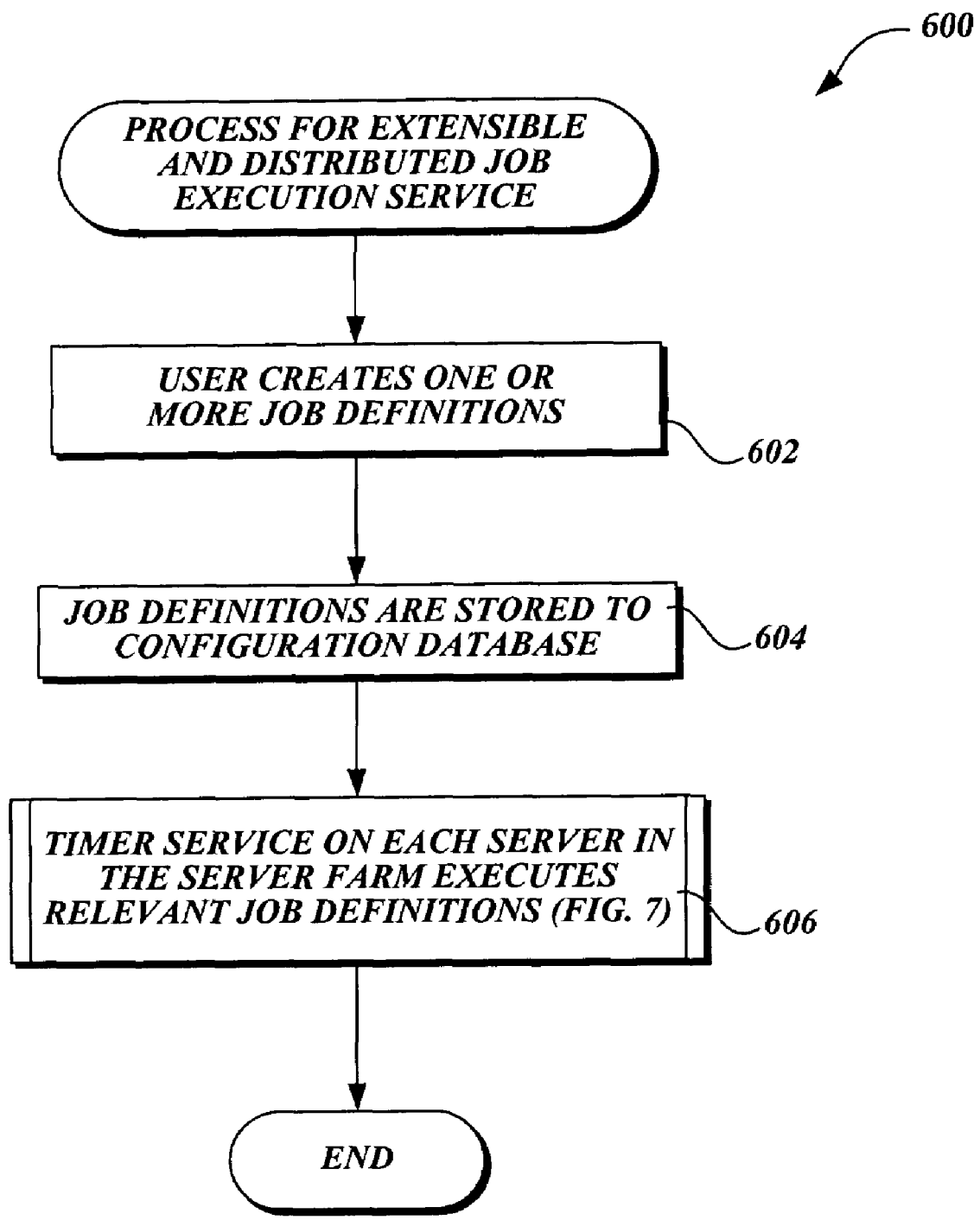
FIG. 6 is a flow diagram illustrating an exemplary process for extensible and distributed job execution service in a server farm.
Figure 7:
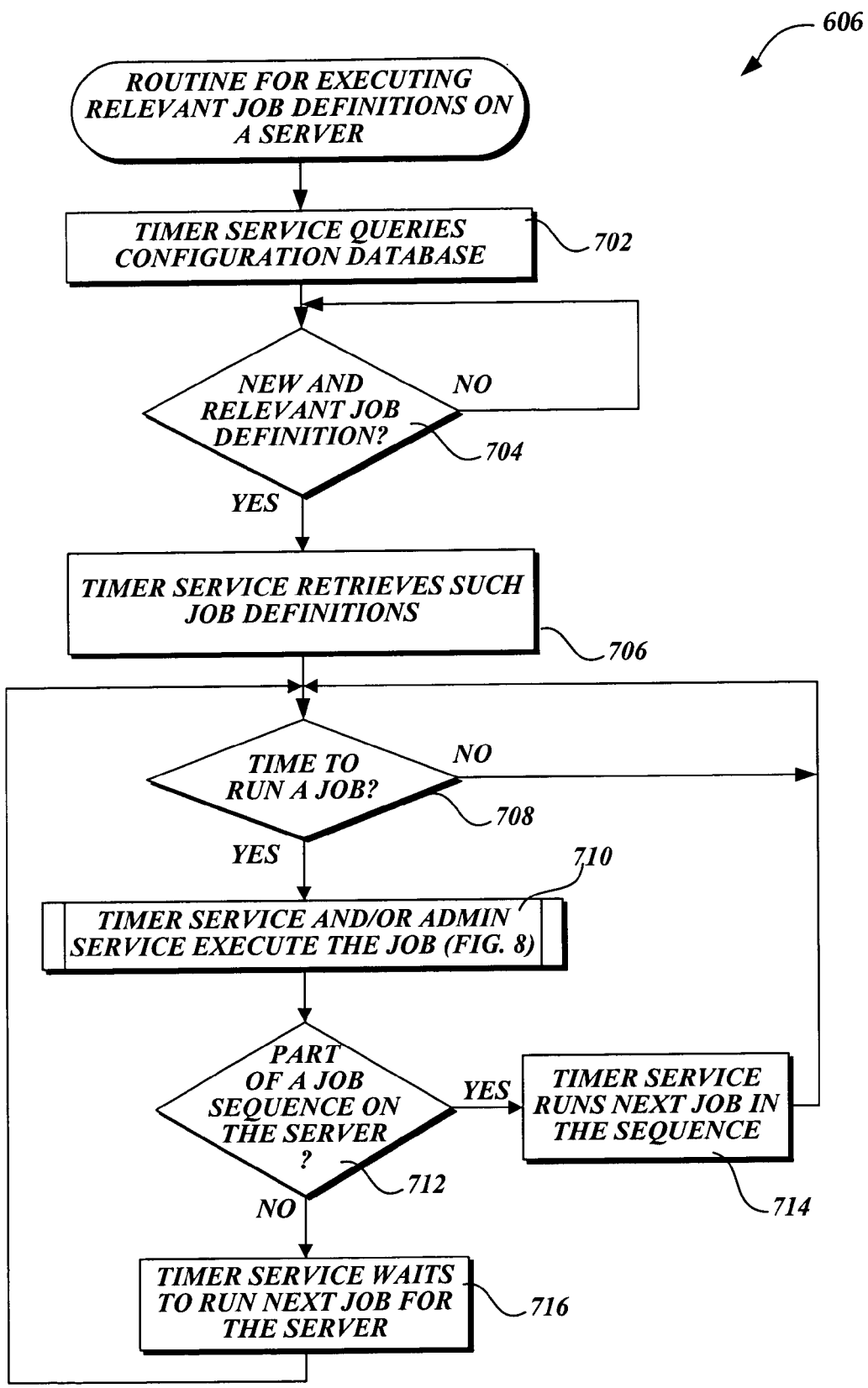
FIG. 7 is a flow diagram illustrating an exemplary routine for executing relevant jobs on a server, suitable for use in FIG. 6.

FIG. 6 is a flow diagram illustrating an exemplary process 600 for extensible and distributed job execution. The process 600 starts by an administrator of a server farm creating one or more job definitions for the server farm. See block 602. The job definitions may be created extending the configuration object model 302 (FIG. 3) and the job definition object model 502 (FIG. 4). The job definitions are then stored in a central location in the server farm such as the configuration database 518 (FIG. 2). See block 604. The process 600 then executes a routine 606 where a timer service such as the timer service 402 (FIG. 4) on each server in the server farm deploys the new job definitions and executes any relevant job definitions. See block 606. FIG. 7 is a flow diagram illustrating an exemplary routine 606 and will be described in detail shortly. The process 600 then ends.

As noted above, FIG. 7 illustrates an exemplary routine 606 where a timer service on each server executes relevant job definitions on the server that the timer service runs on. A job definition is relevant to a timer service on the server if the properties of the job definition indicate that the job can be run on the server. For example, if the value of the Server property 518 of a job definition identifies the server, or if the server runs the service identified by the value of the Service property 516 of the job definition, the job definition is relevant to the timer service. Each server may have one or more server roles assigned to it. A server role is implied by the services that are assigned to the server and are enabled. Exemplary server roles in a Web farm may include front-end servers that run Web applications exclusively, search servers that are responsible for Internet searches, and Excel servers that are responsible for data management. Therefore, a timer service may query and search for job definitions that are relevant to the server roles that the server supports. Such a search also includes any job definitions that are designated to run on servers irrespective of their server roles.

As shown in FIG. 7, the timer service queries the configuration database periodically. See block 702. In an exemplary embodiment of the invention, the timer service may query the configuration database every one minute. The timer service then determines whether there are any new job definitions that are relevant to the server that the timer service runs on. See decision block 704. If the answer to decision block 704 is YES, meaning that the timer service has found new and relevant job definitions for the server, the timer service downloads such job definitions to the server. See block 706. In some embodiments of the invention, the retrieved job definitions are stored in a configuration cache on the server. Alternatively, the timer service may query the configuration database and retrieve any new job definitions that have appeared since the last query. The timer service then identifies the relevant job definitions among the retrieved job definitions.

Figure 8:
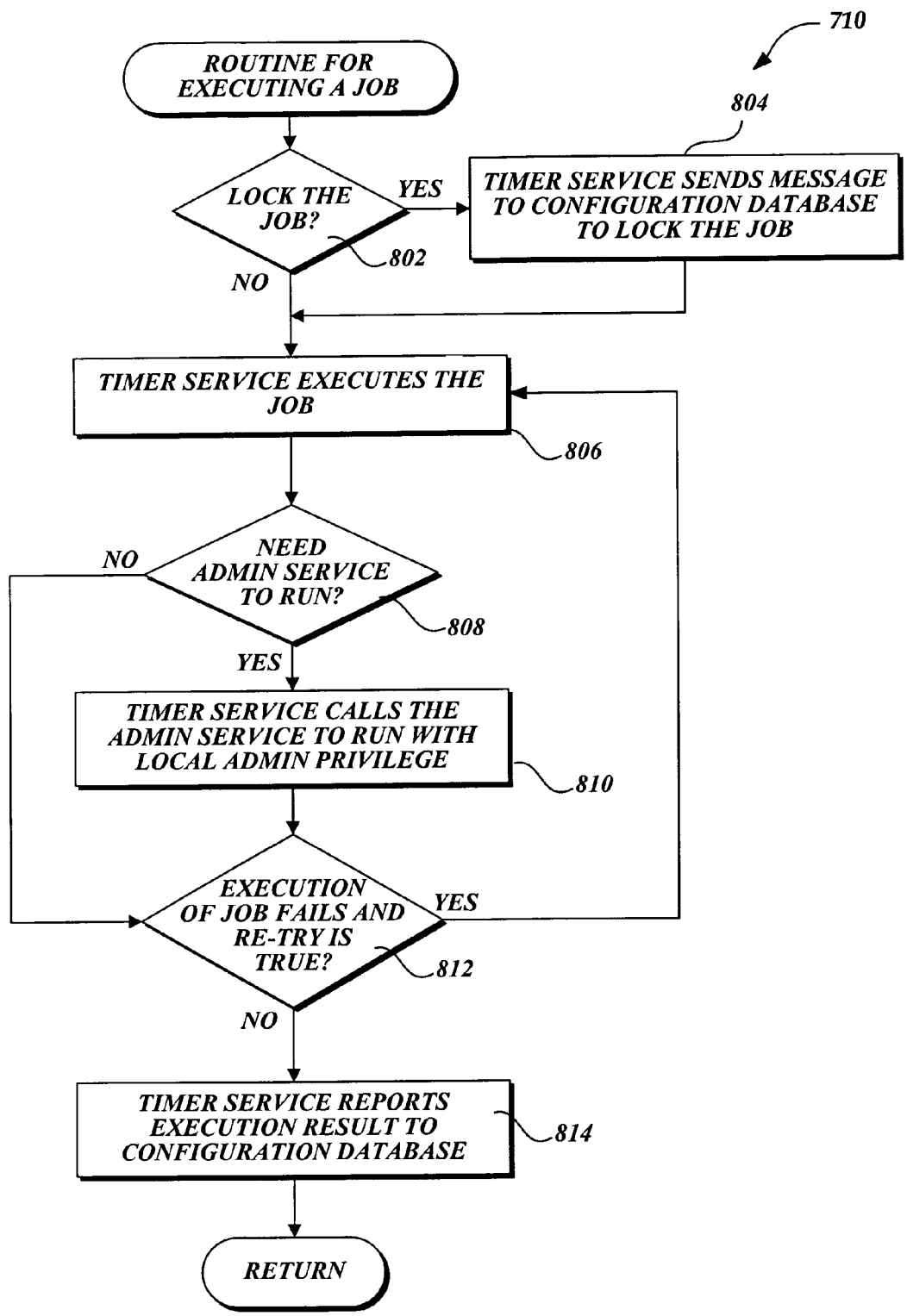
FIG. 8 is a flow diagram illustrating an exemplary routine for executing a job on a server, suitable for use in FIG. 7.

Meanwhile, the timer service checks to determine if it is time to run a job that is already stored on the server. See decision block 708. In embodiments of the invention, the timer service creates an individual thread for running each job. If the answer to decision block 708 is YES, the routine 606 executes a routine 710 where the timer service and/or an admin service such as the admin service 404 (FIG. 4) execute the job. See block 710. FIG. 8 illustrates an exemplary routine 710 and will be described in detail later. After executing the routine 710, the timer service proceeds to check whether the job is part of a job sequence existing on the server. See decision block 712. If the answer is YES, the timer service moves back to decision block 702 to run the next job in the job sequence. See block 714. If the executed job is not part of a job sequence on the server or if the job is the last job in the job sequence, the timer service marks the job as completed.

As noted above, FIG. 8 illustrates an exemplary routine 710 wherein the timer service and/or an admin service execute a job. Embodiments of the invention distribute the execution of multiple instances of a job among different servers in the server farm. For example, when a timer service starts executing a job, the timer service sends a message to the configuration database to "lock" the job, or to a content database to ensure a "lock" on the content database, by indicating that the job is currently being executed or the content database is being processed by multiple jobs, and that no other timer service can execute the job or process the content database. Once the timer service can no longer execute the job, for example if it hangs or crashes, the "lock" on the job or the content database expires. As a result, another timer service can take over the execution of the job or jobs. Therefore, the routine 710 starts by determining whether the job or content database needs to be locked. See decision block 802. If the answer is YES, the timer service will attempt to lock up the job or content database by sending a message to the configuration or content database to indicate that while the timer service is executing the job or processing the content database, no other timer service can execute the job or process the content database. See block 804. In exemplary embodiments of the invention, if the timer service is the first one attempting to run the job, the timer service successfully locks the job or the content database. In an exemplary embodiment of the invention, a timestamp is captured and written to the configuration or content database. Each time another timer service in the server farm attempts to run the job or process the content database, the another timer service examines the timestamp. If the timestamp for a given job or content database exceeds a certain time threshold, such as 20 minutes, the lock on the job is assumed to be void, since the timer service running the job or processing the content database probably has crashed. In such a case, the another timer service may assert the lock.

After acquiring the lock on the job, or if the job being executed does not need a lock, the timer service executes the job. See block 806. As noted above, in embodiments of the invention, the timer service may modify any of the content databases or the configuration database in the server farm, but sometimes not the server on which the timer service runs. Therefore, if the job being executed has operations that modify the server on which the timer service runs, the timer service may transfer executions of such operations to an admin service on the server that has local admin privilege. Therefore, as shown in FIG. 8, the timer service determines whether it needs the admin service to run. See decision block 808. If the answer to decision block 808 is YES, the timer service calls the admin service to run with local admin privilege to execute the specific operations in the job. See block 810. After the admin service completes executing the specific operations, or if the timer service completes the execution of the job without involving the admin service, the timer service proceeds to determine if the execution of the job has failed in some way and if the failed job can be re-executed. See decision block 812. If the answer to decision block 812 is YES, the routine 710 loops back to block 806 so that the timer service can restart the execution of the job at a predetermined time. If the answer to decision block 812 is NO, then the job has been successfully executed or the execution of the job has failed but cannot the job be re-executed. The timer service reports the execution result to the configuration database. See block 814. The routine 710 then returns. Preferable, if a job execution includes modifying the configuration of a local service, usually via the admin service, the job will restart the service in question so that the modification takes effect.

While the exemplary embodiments of the present invention have been illustrated and described, it will be appreciated that various changes can be made therein without departing from the spirit and scope of the present invention.

The embodiments of the invention in which an exclusive property or privilege is claimed are defined as follows:

1. A server farm, comprising:
   a configuration database for storing all job definitions for the server farm; and
   a plurality of servers operatively connected to the configuration database to allow job definitions in the configuration database to be accessed by the plurality of servers, wherein each of the plurality of servers contains a timer service for executing a job defined by one or more of the job definitions that are suitable to be executed on the server, wherein the one or more job definitions defining the job is locked when no other timer service is allowed to execute the job at the same time, wherein the timer service does not have a privilege to modify entities on the server and if one of the one or more of the job definitions includes at least one function that requires the privilege, the server provides an admin service that has the privilege to execute the function.

2. The server farm of claim 1, wherein each of the job definitions extends a configuration object model that allows the job definition to be submitted to the configuration database without modifying schema of the configuration database.

3. The server farm of claim 2, wherein each of the job definitions includes one or more properties for defining a job.

4. The server farm of claim 3, wherein the one or more properties are selected from a group of properties consisting of:
   a property for identifying the job;
   a property for identifying a next job in a job sequence if the job belongs to a job sequence comprising a plurality of jobs that are to be executed in sequence;
   a property for identifying implementation code for the job;
   a property for identifying a schedule for running the job;
   a property for identifying when the job is lastly run, if the job is a recurring job;
   a property for identifying whether the job is to be run exclusively on one of the plurality of servers;
   a property for identifying one of the plurality of servers on which the job will run;
   a property for identifying whether the job can be re-executed if an execution of the job fails; and
   a property for disabling a job temporarily.

5. The server farm of claim 4, wherein each of the job definitions further includes one or more functions selected from a group of functions consisting of:
   a function for updating the one or more properties;
   a function for updating progress of a running instance of the job;
   a function for deleting the job definition; and
   a function for starting to execute the job.

6. The server farm of claim 1, further comprising an interface providing a functionality selected from a group of functionalities consisting of viewing the job definitions and modifying the job definitions.

7. The server farm of claim 6, wherein the interface is external to the server farm.

8. The server farm of claim 1, wherein the configuration database further stores one or more running job objects, each of which represents a running instance of a job defined by one of the job definitions.

9. The server farm of claim 8, wherein the running job object includes one or more properties for the running instance of the job.

10. The server farm of claim 9, wherein the one or more properties are selected from a group of properties consisting of:
    a property for identifying a starting time of the running instance of the job;
    a property for identifying a status of the running instance of the job;
    a property for identifying a percentage of work that the running instance of the job has completed;
    a property for identifying a service associated with the job;
    a property for identifying a server on which the running instance of the job runs; and a property for identifying the job definition defining the job.

11. The server farm of claim 9, wherein the running job object further includes a function for stopping the running instance of the job.

12. The server farm of claim 8, wherein the configuration database further stores one or more service objects.

13. The server farm of claim 12, wherein each of the one or more service objects include one or more properties.

14. The server farm of claim 13, wherein the one or more properties are selected from a group of properties consisting of:
    a property for identifying the one or more job definitions; and
    a property for identifying running job objects for running instances of jobs on the server.

15. A computer-implemented method for implementing an extensible and distributed job execution service, performed by a timer service running on each of a plurality of servers in a server farm, wherein the server farm includes a configuration database for storing all job definitions for the server farm and one or more content databases storing data for the plurality of servers, the method comprising:
    querying periodically by one of the servers in the server farm the configuration database to identify one or more of the job definitions that are suitable to run on the one of the servers;
    downloading the one or more job definitions to the one of the servers;
    executing by timer service of the one of the servers a job defined by one of the one or more job definitions at a time scheduled for the job; and
    locking the one of the one or more job definitions in the configuration database when no other timer service is allowed to execute the job at the same time that the timer service executes the job.

16. The computer-implemented method of claim 15, wherein executing the job includes: upon determining that the job includes one or more functions modifying the one of the servers, engaging an admin service that has a local admin privilege to execute the one or more functions.

17. The computer-implemented method of claim 15, wherein executing the job further includes: locking a content database that the job aims to process if no other timer service is allowed to process the content database at the same time that the timer service processes the content database.

18. The computer-implemented method of claim 15, further comprising: re-executing the job if execution of the job has failed and the one of the one or more job definitions indicates that the job can be re-executed.

19. The computer-implemented method of claim 15, further comprising: notifying the configuration database of a result of executing the job.

20. The computer-implemented method of claim 15, further comprising: if the job is part of a job sequence comprising a plurality of jobs to be executed in sequence, executing a next job in the job sequence if the job is executed successfully.

* * * * *